US012624672B2

(12) United States Patent
Gormley

(10) Patent No.: US 12,624,672 B2
(45) Date of Patent: May 12, 2026

(54) VARIABLE AREA NOZZLE ASSEMBLY

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/629,495

(22) Filed: Apr. 8, 2024

(65) Prior Publication Data

US 2025/0314218 A1     Oct. 9, 2025

(51) Int. Cl.
| | |
|---|---|
| *F02K 1/12* | (2006.01) |
| *F02K 1/00* | (2006.01) |
| *F02K 1/09* | (2006.01) |
| *F02K 1/80* | (2006.01) |

(52) U.S. Cl.
CPC ............ *F02K 1/1207* (2013.01); *F02K 1/004* (2013.01); *F02K 1/09* (2013.01); *F02K 1/805* (2013.01)

(58) Field of Classification Search
CPC .... F01D 17/141; F01D 17/143; F02K 1/1207; F02K 1/004; F02K 1/805; F02K 1/08; F02K 1/09; F16K 35/00; B64D 29/06; F04F 5/461
See application file for complete search history.

(56) References Cited

U.S. PATENT DOCUMENTS

| | | | | |
|---|---|---|---|---|
| 3,667,680 A | * | 6/1972 | Weed | F02K 1/822 |
| | | | | 60/764 |
| 3,836,309 A | * | 9/1974 | Thiel | B29C 51/18 |
| | | | | 425/383 |

| | | | | |
|---|---|---|---|---|
| 4,489,889 A | * | 12/1984 | Inman | F02K 9/976 |
| | | | | 239/265.33 |
| 5,269,467 A | | 12/1993 | Williams | |
| 5,680,755 A | | 10/1997 | Hauer | |
| 6,192,671 B1 | | 2/2001 | Elorriaga | |
| 9,989,009 B2 | | 6/2018 | Bakken | |
| 10,040,563 B1 | * | 8/2018 | Pinto | B64D 29/06 |
| 10,125,721 B2 | | 11/2018 | Kerbler | |
| 11,867,136 B2 | | 1/2024 | Gormley | |
| 2008/0072571 A1 | * | 3/2008 | Beardsley | F02K 1/72 |
| | | | | 60/226.2 |

(Continued)

*Primary Examiner* — Devon C Kramer
*Assistant Examiner* — Henry Ng
(74) *Attorney, Agent, or Firm* — Getz Balich LLC

(57) ABSTRACT

A variable area nozzle assembly includes a fixed nozzle structure, a translating sleeve, a plurality of nozzle segments, and a plurality of segment hoop locking assemblies. The translating sleeve is movably mounted to the fixed nozzle structure. The translating sleeve is translatable along the nozzle axis within the fixed nozzle structure between and to a first axial position and a second axial position. The plurality of nozzle segments form a variable area nozzle extending circumferentially about the nozzle axis. Each nozzle segment of the plurality of nozzle segments is pivotably mounted to the translating sleeve. The plurality of nozzle segments includes a first nozzle segment and a second nozzle segment. The plurality of segment hoop locking assemblies include a first segment hoop locking assembly. The first segment hoop locking assembly includes a hoop crank. With the translating sleeve in the first axial position or the second axial position, the hoop crank restricts circumferential movement of the first nozzle segment relative to the second nozzle segment.

14 Claims, 10 Drawing Sheets

(56) References Cited

U.S. PATENT DOCUMENTS

| | | | | |
|---|---|---|---|---|
| 2010/0327078 | A1* | 12/2010 | Baker | F02K 1/16 239/127.1 |
| 2012/0137654 | A1* | 6/2012 | Burgess | F02K 1/763 60/204 |
| 2013/0062435 | A1* | 3/2013 | Moradell-Casellas | F02K 1/09 239/265.37 |
| 2013/0292489 | A1* | 11/2013 | Vauchel | F02K 1/62 239/265.19 |
| 2013/0312387 | A1* | 11/2013 | West | F02K 1/766 60/226.2 |
| 2014/0000238 | A1* | 1/2014 | Gonidec | F02K 1/766 49/449 |
| 2014/0030057 | A1* | 1/2014 | Gormley | F02K 1/42 415/126 |
| 2015/0097056 | A1* | 4/2015 | Caruel | F02K 1/766 239/265.19 |
| 2015/0267639 | A1* | 9/2015 | Gormley | F02K 1/72 60/226.2 |
| 2015/0275766 | A1* | 10/2015 | Kohlenberg | F02K 1/09 415/122.1 |
| 2017/0022935 | A1* | 1/2017 | Corentin | F02K 1/70 |
| 2017/0107943 | A1* | 4/2017 | Franer | F02K 1/763 |
| 2017/0226961 | A1* | 8/2017 | Smith | F02K 1/76 |
| 2017/0298870 | A1* | 10/2017 | Boileau | F02K 1/766 |
| 2018/0274485 | A1* | 9/2018 | Gormley | F02K 1/766 |
| 2019/0162136 | A1* | 5/2019 | Lacko | F02K 1/763 |
| 2021/0040915 | A1* | 2/2021 | Gormley | F02K 1/763 |
| 2021/0131380 | A1* | 5/2021 | Gormley | F02C 7/32 |

* cited by examiner

VARIABLE AREA NOZZLE ASSEMBLY

BACKGROUND

1. Technical Field

This disclosure relates generally to aircraft propulsion systems, and more particularly to variable area nozzle assemblies for aircraft propulsion systems.

2. Background Information

Propulsion systems for aircraft may frequently include variable area exhaust nozzles to accommodate subsonic, transonic, and/or supersonic speeds. Due to the different properties of exhaust gases as they flow through the nozzle at different speeds, there may be a need to vary the area of the nozzle at one or more locations within the nozzle in order to ensure proper and efficient propulsion system operation over a range of aircraft flight conditions. Various aircraft propulsion system variable area nozzles are known in the art. While these known variable area nozzles may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a variable area nozzle assembly for an aircraft propulsion system includes a fixed nozzle structure, a translating sleeve assembly, a plurality of nozzle segments, and a plurality of segment hoop locking assemblies. The fixed nozzle structure extends circumferentially about a nozzle axis. The translating sleeve assembly includes a translating sleeve. The translating sleeve is movably mounted to the fixed nozzle structure. The translating sleeve is translatable along the nozzle axis within the fixed nozzle structure between and to a first axial position and a second axial position. The plurality of nozzle segments form a variable area nozzle extending circumferentially about the nozzle axis. Each nozzle segment of the plurality of nozzle segments is pivotably mounted to the translating sleeve. The plurality of nozzle segments includes a first nozzle segment and a second nozzle segment. The first nozzle segment is circumferentially adjacent the second nozzle segment. The plurality of segment hoop locking assemblies include a first segment hoop locking assembly. The first segment hoop locking assembly includes a lock crank, a hoop crank, a first hoop crank receiver, and a second hoop crank receiver. The lock crank is pivotably mounted to the translating sleeve. The lock crank is pivotable about a pivot axis. The hoop crank is connected to the lock crank. The hoop crank includes a first locking aperture and a second locking aperture. The first hoop crank receiver is mounted on the first nozzle segment and disposed within the first locking aperture. The second hoop crank receiver is mounted on the second nozzle segment and disposed within the second locking aperture. The lock crank is pivotable about the pivot axis to configure the hoop crank in a first locking condition and a second locking condition. With the translating sleeve in the first axial position, the lock crank positions the hoop crank to configure the hoop crank in the first locking condition to restrict circumferential movement of the first nozzle segment relative to the second nozzle segment. With the translating sleeve in the second axial position, the lock crank positions the hoop crank to configure the hoop crank in the second locking condition to restrict circumferential movement of the first nozzle segment relative to the second nozzle segment.

In any of the aspects or embodiments described above or herein, the variable area nozzle may extend axially between and to an upstream nozzle end and a downstream nozzle end. The upstream nozzle end may form a throat cross-sectional area of the variable area nozzle. The downstream nozzle end may form an outlet cross-sectional area of the variable area nozzle. Translation of the translating sleeve along the nozzle axis may vary a cross-sectional area of the throat cross-sectional area and the outlet cross-sectional area.

In any of the aspects or embodiments described above or herein, with the translating sleeve in the first axial position, the throat cross-sectional area may have a minimum throat cross-sectional area and the outlet cross-sectional area may have a maximum outlet cross-sectional area.

In any of the aspects or embodiments described above or herein, with the translating sleeve in the second axial position, the throat cross-sectional area may have a maximum throat cross-sectional area and the outlet cross-sectional area may have a minimum outlet cross-sectional area.

In any of the aspects or embodiments described above or herein, the fixed nozzle structure may include a downstream structure end. In the first axial position the translating sleeve may position the variable area nozzle in a retracted position with the downstream nozzle end disposed axially upstream of the downstream structure end. In the second axial position the translating sleeve may position the variable area nozzle in an extended position with the downstream nozzle end disposed axially downstream of the downstream structure end.

In any of the aspects or embodiments described above or herein, the first segment hoop locking assembly may include a link. The lock crank may include a first arm portion. The first arm portion may extend radially outward from the pivot axis to a first distal end. The link is pivotably mounted to the first distal end and the hoop crank.

In any of the aspects or embodiments described above or herein, the lock crank may include a second arm portion. The second arm portion may extend radially outward from the pivot axis to a second distal end. In the first axial position of the translating sleeve the second distal end may be separated from the fixed nozzle structure. In the second axial position of the translating sleeve the second distal end may contact the fixed nozzle structure.

In any of the aspects or embodiments described above or herein, the first arm portion and the second arm portion may be circumferentially offset relative to the pivot axis.

In any of the aspects or embodiments described above or herein, the first locking aperture may include a first lobe portion and a second lobe portion. The first lobe portion and the second lobe portion may be interconnected to form the first locking aperture.

In any of the aspects or embodiments described above or herein, in the first locking condition of the hoop crank the first hoop crank receiver may be disposed within the first lobe portion and in the second locking condition of the hoop crank the first hoop crank receiver may be disposed within the second lobe portion.

In any of the aspects or embodiments described above or herein, the first lobe portion may extend lengthwise along a first lobe axis. The second lobe portion may extend lengthwise along a second lobe axis. The first lobe axis may intersect the second lobe axis within the first locking aperture.

In any of the aspects or embodiments described above or herein, the fixed nozzle structure may include an inner radial structure side forming a ramped upstream surface portion and a ramped downstream surface portion. Each nozzle segment of the plurality of nozzle segments may include a segment roller disposed at the ramped upstream surface portion and configured to roll along the ramped upstream surface portion as the translating sleeve translates between the first axial position and the second axial position.

In any of the aspects or embodiments described above or herein, the variable area nozzle assembly may further include a plurality of segment cranks. Each segment crank of the plurality of segment cranks may be pivotally mounted to the translating sleeve and to a respective nozzle segment of the plurality of nozzle segments. Each segment crank may include a crank roller disposed at the ramped downstream surface portion and configured to roll along the ramped downstream surface portion as the translating sleeve translates between the first axial position and the second axial position.

According to another aspect of the present disclosure, a variable area nozzle assembly for an aircraft propulsion system includes a fixed nozzle structure, a translating sleeve assembly, a plurality of nozzle segments, and a plurality of segment hoop locking assemblies. The fixed nozzle structure extends circumferentially about a nozzle axis. The translating sleeve assembly including a translating sleeve. The translating sleeve is movably mounted to the fixed nozzle structure. The translating sleeve is translatable along the nozzle axis within the fixed nozzle structure between and to a first axial position and a second axial position. The plurality of nozzle segments form a variable area nozzle extending circumferentially about the nozzle axis. Each nozzle segment of the plurality of nozzle segments is pivotally mounted to the translating sleeve. The plurality of nozzle segments includes a first nozzle segment and a second nozzle segment. The first nozzle segment is circumferentially adjacent the second nozzle segment. The plurality of segment hoop locking assemblies includes a first segment hoop locking assembly. The first segment hoop locking assembly includes a lock crank, a hoop crank, a first hoop crank receiver, and a second hoop crank receiver. The lock crank is pivotally mounted to the translating sleeve. The lock crank is pivotable about a pivot axis. The hoop crank is pivotally connected to the lock crank. The hoop crank includes a first locking aperture and a second locking aperture. The first locking aperture includes a first lobe portion and a second lobe portion. The first lobe portion and the second lobe portion are interconnected to form the first locking aperture. The first lobe portion extends lengthwise along a first lobe axis. The second lobe portion extends lengthwise along a second lobe axis different than the first lobe axis. The first hoop crank receiver is mounted on the first nozzle segment and disposed within the first locking aperture. The second hoop crank receiver is mounted on the second nozzle segment and disposed within the second locking aperture. The second nozzle segment is pivotally mounted to the hoop crank by the second hoop crank receiver.

In any of the aspects or embodiments described above or herein, the first segment hoop locking assembly may include a link. The lock crank may include a first arm portion. The first arm portion may extend radially outward from the pivot axis to a first distal end. The link may be pivotally mounted to the first distal end and the hoop crank.

In any of the aspects or embodiments described above or herein, the lock crank may include a second arm portion. The second arm portion may extend radially outward from the pivot axis to a second distal end. The lock crank may include a lock crank roller at the second distal end.

In any of the aspects or embodiments described above or herein, the first lobe axis may intersect the second lobe axis within the first locking aperture. The first lobe axis and the second lobe axis may be non-orthogonal.

In any of the aspects or embodiments described above or herein, the variable area nozzle may extend axially between and to an upstream nozzle end and a downstream nozzle end. The upstream nozzle end may form a throat cross-sectional area of the variable area nozzle. The downstream nozzle end may form an outlet cross-sectional area of the variable area nozzle. Translation of the translating sleeve along the nozzle axis may vary a cross-sectional area of the throat cross-sectional area and the outlet cross-sectional area.

In any of the aspects or embodiments described above or herein, with the translating sleeve in the first axial position, the throat cross-sectional area may have a minimum throat cross-sectional area and the outlet cross-sectional area may have a maximum outlet cross-sectional area. With the translating sleeve in the second axial position, the throat cross-sectional area may have a maximum throat cross-sectional area and the outlet cross-sectional area may have a minimum outlet cross-sectional area.

According to another aspect of the present disclosure, a variable area nozzle assembly for an aircraft propulsion system includes a plurality of nozzle segments and a plurality of segment hoop locking assemblies. The plurality of nozzle segments form a variable area nozzle extending circumferentially about a nozzle axis. The plurality of nozzle segments include a first nozzle segment and a second nozzle segment. The first nozzle segment is circumferentially adjacent the second nozzle segment. The plurality of segment hoop locking assemblies include a first segment hoop locking assembly. The first segment hoop locking assembly includes a hoop crank, a first hoop crank receiver, and a second hoop crank receiver. The hoop crank includes a first locking aperture and a second locking aperture. The first locking aperture includes a first lobe portion and a second lobe portion. The first lobe portion and the second lobe portion are interconnected to form the first locking aperture. The first lobe portion extends lengthwise along a first lobe axis. The second lobe portion extends lengthwise along a second lobe axis different than the first lobe axis. The first hoop crank receiver is mounted on the first nozzle segment and disposed within the first locking aperture. The second hoop crank receiver is mounted on the second nozzle segment and disposed within the second locking aperture.

The present disclosure, and all its aspects, embodiments and advantages associated therewith will become more readily apparent in view of the detailed description provided below, including the accompanying drawings.

DETAILED DESCRIPTION

Figure 1:
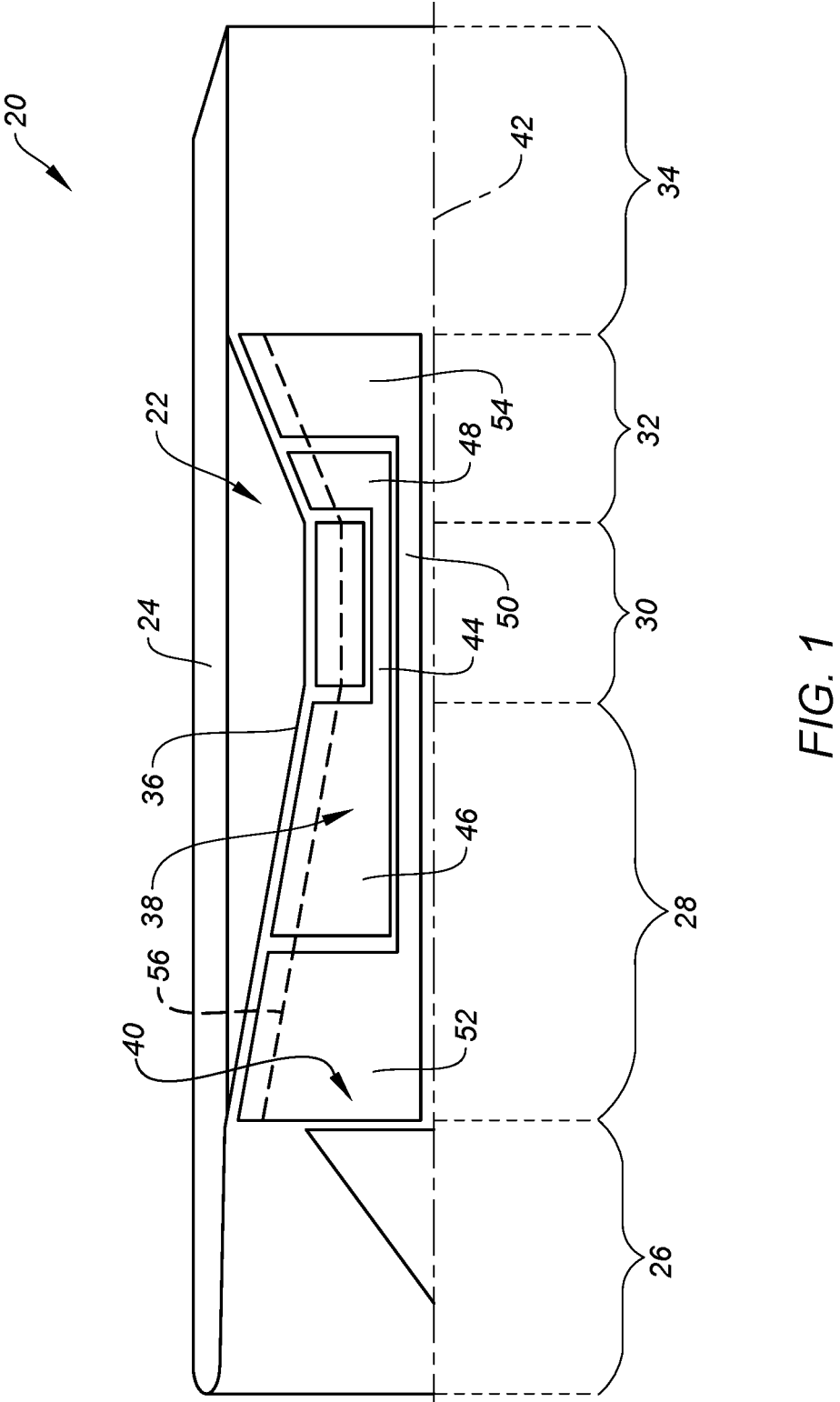
FIG. 1 illustrates a cutaway, side view of a propulsion system for an aircraft, in accordance with one or more embodiments of the present disclosure.

FIG. 1 schematically illustrates a propulsion system 20 for an aircraft. The propulsion system 20 includes a gas turbine engine 22 and a nacelle 24. The gas turbine engine 22 of FIG. 1 is a multi-spool turbojet gas turbine engine. However, while the following description and accompanying drawings may refer to the turbojet gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbofan gas turbine engine, a propfan gas turbine engine, or an open rotor gas turbine engine.

The gas turbine engine 22 of FIG. 1 includes an inlet section 26, a compressor section 28, a combustor section 30, a turbine section 32, and exhaust section 34, and an engine static structure 36. Components of the compressor section 28 and the turbine section 32 form a first rotational assembly 38 (e.g., a high-pressure spool) and a second rotational assembly 40 (e.g., a low-pressure spool) of the gas turbine engine 22. The first rotational assembly 38 and the second rotational assembly 40 are mounted for rotation about a rotational axis 42 (e.g., an axial centerline of the gas turbine engine 22) relative to the engine static structure 36.

The first rotational assembly 38 includes a first shaft 44, a bladed first compressor rotor 46 for the compressor section 28, and a bladed first turbine rotor 48 for the turbine section

32. The first shaft 44 interconnects the bladed first compressor rotor 46 and the bladed first turbine rotor 48.

The second rotational assembly 40 includes a second shaft 50, a bladed second compressor rotor 52 for the compressor section 28, and a bladed second turbine rotor 54 for the turbine section 32. The second shaft 50 interconnects the bladed second compressor rotor 52 and the bladed second turbine rotor 54.

The engine static structure 36 may include one or more engine cases, cowlings, bearing assemblies, and/or other non-rotating structures configured to house and/or support (e.g., rotationally support) components of the gas turbine engine 22 sections 26, 28, 30, 32, 34.

The nacelle 24 forms an exterior aerodynamic housing for the propulsion system 20. The nacelle 24 of FIG. 2 extends circumferentially about (e.g., completely around) the gas turbine engine 22 (e.g., the rotational axis 42). The nacelle 24 is mounted to the gas turbine engine 22 (e.g., the engine static structure 36) at one or more locations to securely position the gas turbine engine 22 within the nacelle 24 and to facilitate mounting of the propulsion system 20 and its gas turbine engine 22 onto an aircraft, for example, using a pylon or other mounting structure. The nacelle 24 of FIG. 2 surrounds and forms portions of the inlet section 26 and the exhaust section 34.

In operation of the propulsion system 20 of FIG. 1, ambient air is directed through the inlet section 26 and into a core flow path 56 (e.g., an annular flow path). Airflow along the core flow path 56 is compressed in the compressor section 28, mixed and burned with fuel in the combustor section 30, and then directed through the turbine section 32, thereby driving rotation of the first rotational assembly 38 and the second rotational assembly 40. Combustion exhaust gas from the core flow path 56 is exhausted from the propulsion system 20 through the exhaust section 34 to generate thrust for the propulsion system 20 and associated aircraft.

Figures 2A, 2B:
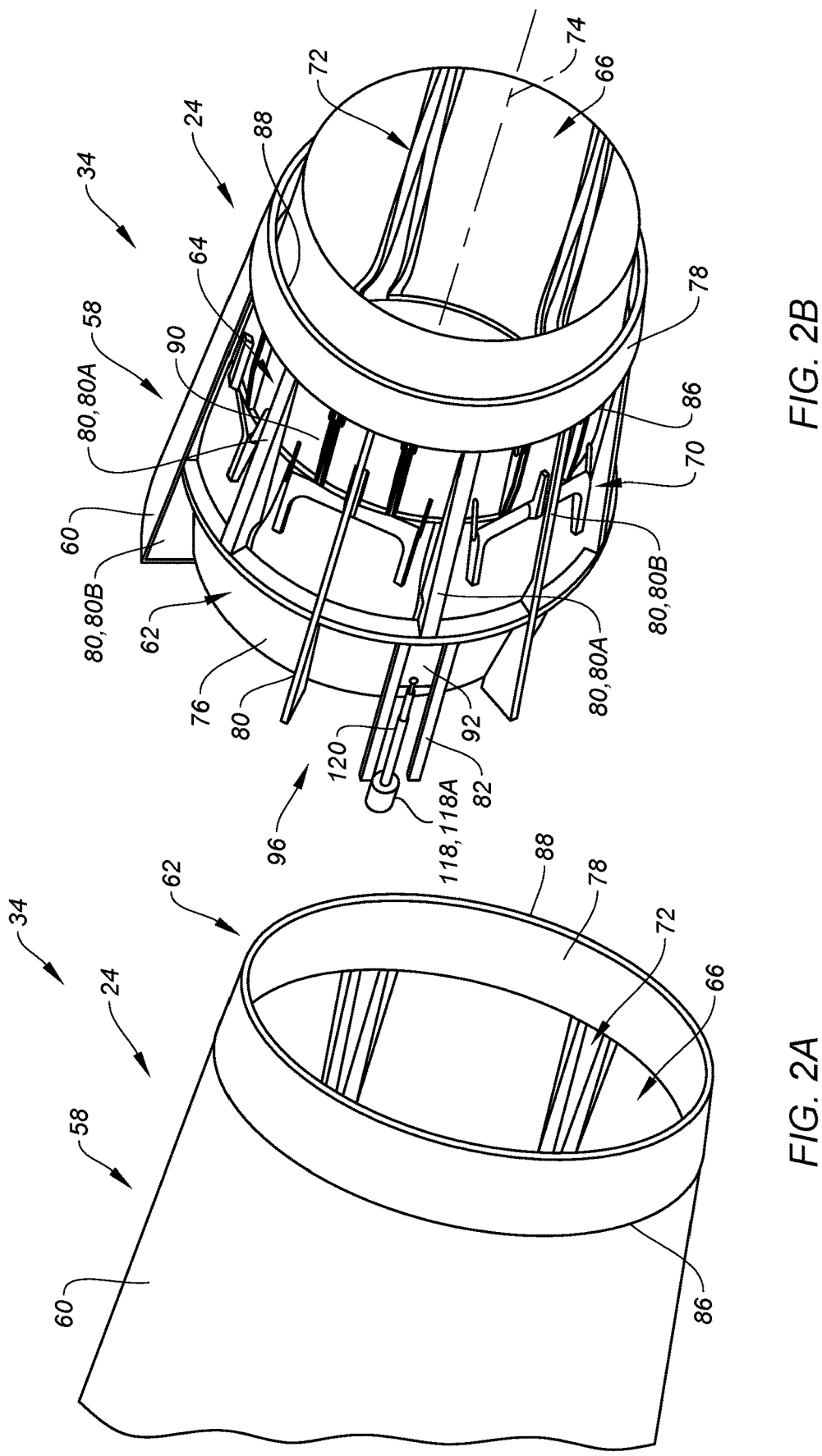
FIGS. 2A and 2B illustrate perspective views of a variable area nozzle assembly, in accordance with one or more embodiments of the present disclosure.

Referring to FIGS. 2A and 2B, the propulsion system 20 (see FIG. 1) further includes a variable area nozzle assembly 58 for the exhaust section 34. The portions of the variable area nozzle assembly 58 may include and/or by formed by the nacelle 24 and/or the engine static structure 36 (see FIG. 1). The variable area nozzle assembly 58 of FIGS. 2A and 2B includes an outer skin 60, a fixed nozzle structure 62, a translating sleeve assembly 64, a plurality of nozzle segments 66, and a plurality of segment cranks 70. The variable area nozzle assembly 58 may additionally include a plurality of segment seals 72. The variable area nozzle assembly extends circumferentially about (e.g., completely around) a nozzle axis 74 (e.g., a centerline axis of the variable area nozzle assembly 58). The nozzle axis 74 may be coaxial with or parallel or substantially parallel to the rotational axis 42 (see FIG. 1). However, the present disclosure is not limited to any particular orientation of the nozzle axis 74 relative to the rotational axis 42. FIG. 2A illustrates a perspective view of a portion of the variable area nozzle assembly 58. FIG. 2B illustrates the variable area nozzle assembly 58 with portions of the outer skin 60 omitted to illustrate internal components of the variable area nozzle assembly 58. FIGS. 2A and 2B illustrate the nozzle segments 66 in different axial positions, relative to the nozzle axis 74.

The outer skin 60 is a fixed structure of the variable area nozzle assembly 58 which forms an exterior housing and aerodynamic outer surface of the variable area nozzle assembly 58. The outer skin 60 extends circumferentially about (e.g., completely around) the nozzle axis 74 to circumscribe components of the variable area nozzle assembly 58. The outer skin 60 is mounted to or otherwise disposed at (e.g., on, adjacent, or proximate) the fixed nozzle structure 62.

Figure 3:
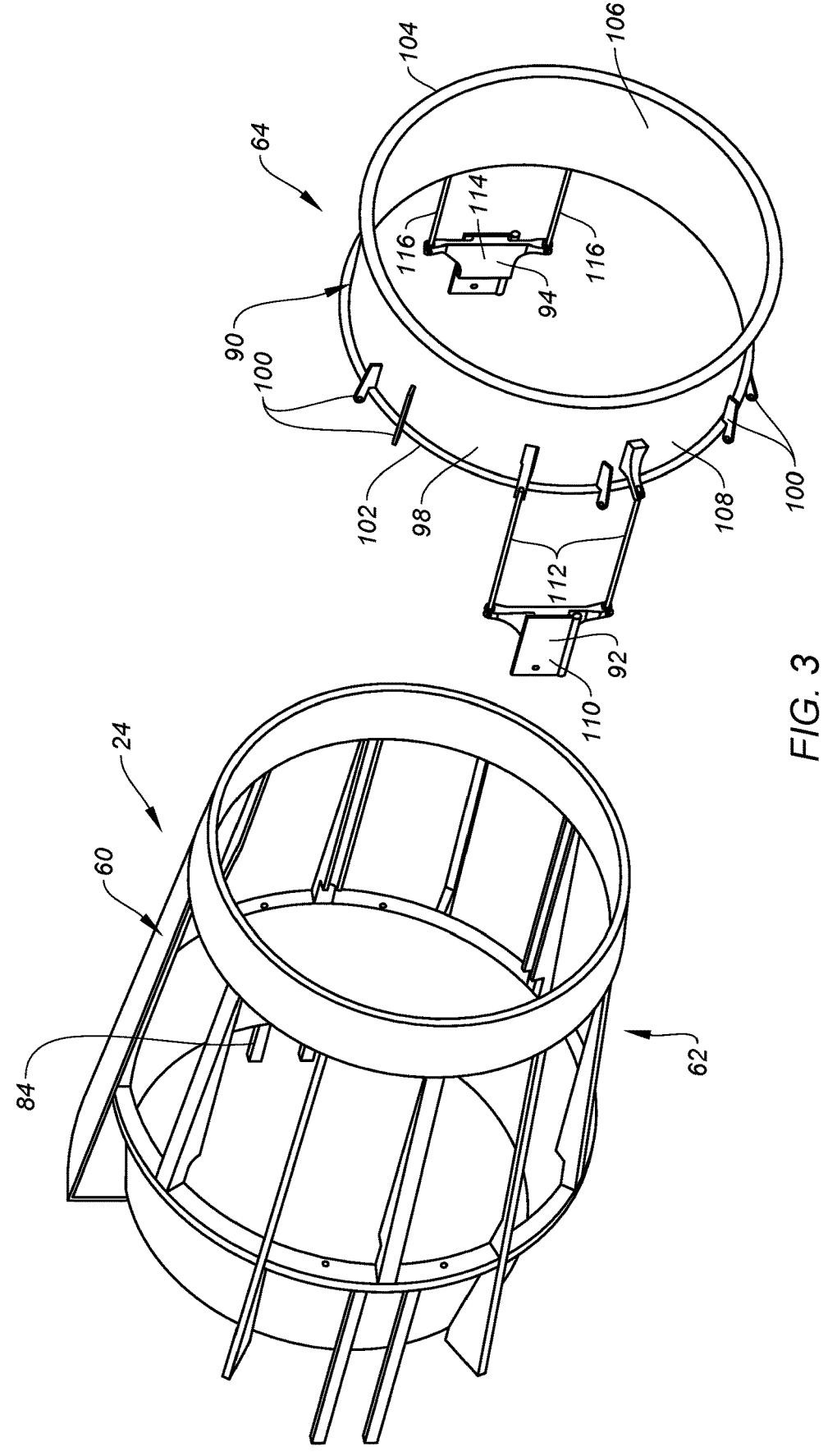
FIG. 3 illustrates an exploded perspective view of a portion of the variable area nozzle assembly, in accordance with one or more embodiments of the present disclosure.
Figures 4, 5:
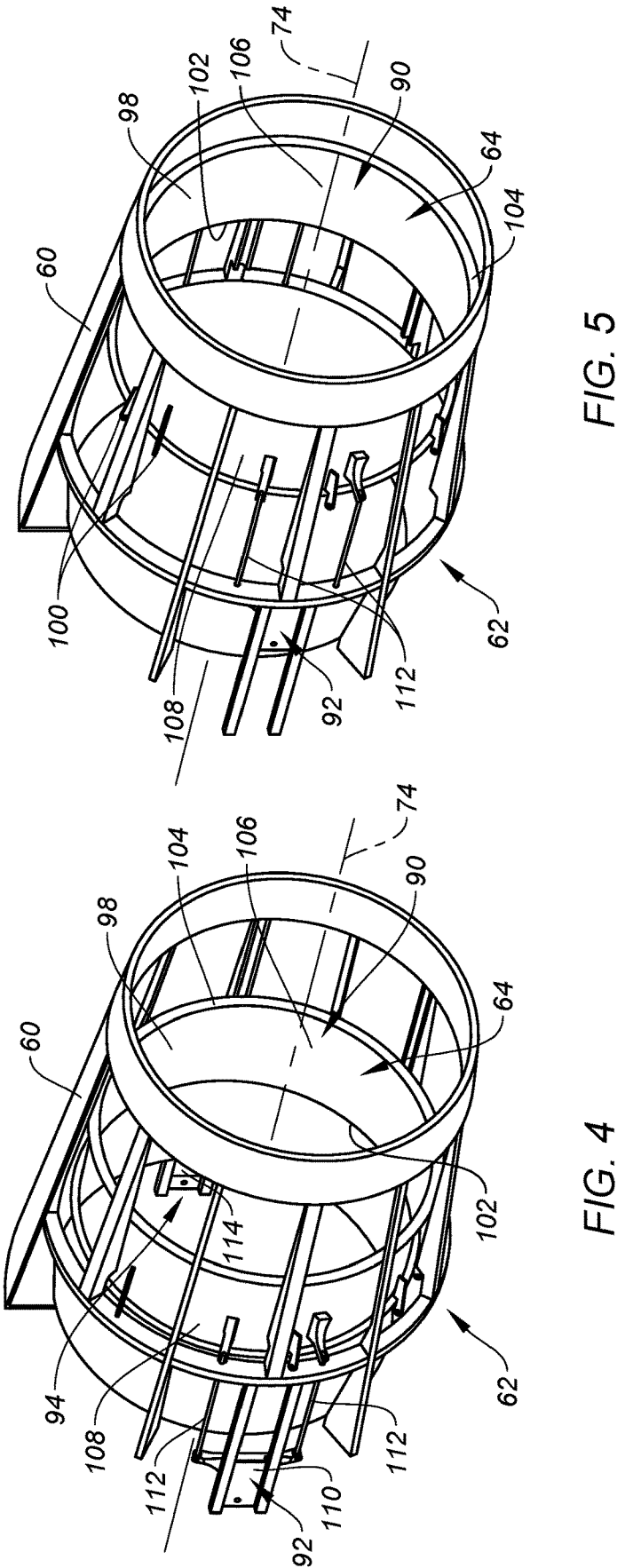
FIG. 4 illustrates a perspective view of the variable area nozzle assembly with a translating sleeve in a first position, in accordance with one or more embodiments of the present disclosure.
FIG. 5 a perspective view of the variable area nozzle assembly with the translating sleeve in a second position, in accordance with one or more embodiments of the present disclosure.

The fixed nozzle structure 62 supports components of the variable area nozzle assembly 58 including, but not limited to, the outer skin 60 and the translating sleeve assembly 64. The fixed nozzle structure 62 of FIGS. 2A and 2B includes an upstream ring body 76, a downstream ring body 78, a plurality of axial beams 80, a first lateral rail 82, and a second lateral rail 84 (see FIG. 3). The upstream ring body 76 extends circumferentially about (e.g., completely around) the nozzle axis 74. As used herein, the terms "upstream" and "downstream" refer to a general direction of gas turbine engine 22 exhaust gas flow through the variable area nozzle assembly 58 and relative to the nozzle axis 74 (e.g., axially upstream or axially downstream). The upstream ring body 76 may be mounted to or otherwise disposed at (e.g., on, adjacent, or proximate) the engine static structure 36. The downstream ring body 78 extends circumferentially about (e.g., completely around) the nozzle axis 74. The down-stream ring body 78 is disposed axially downstream of (e.g., aftward of) the upstream ring body 76. The downstream ring body 78 extends axially between and to an upstream end 86 (e.g., an upstream end) of the downstream ring body 78 and a downstream end 88 (e.g., a downstream end) of the downstream ring body 78. The downstream end 88 forms a distal downstream end of the fixed nozzle structure 62.

The axial beams 80 extend (e.g., axially extend) between and connect the upstream ring body 76 and the downstream ring body 78. The axial beams 80 may be circumferentially distributed as shown, for example, in FIG. 2B. The axial beams 80 of FIG. 2B include sleeve guide beams 80A and segment guide beams 80B. The sleeve guide beams 80A and the segment guide beams 80B may be alternatingly distributed circumferentially about the nozzle axis 74. The sleeve guide beams 80A may contact components of translating sleeve assembly 64 to guide movement of these components in the axial direction and to limit movement of these components in the circumferential direction and the radial direction. The segment guide beams 80B may contact components of the nozzle segments 66 and the segment cranks 70 to guide movement of the nozzle segments 66 and control rotation of the segment cranks 70.

The first lateral rail 82 and the second lateral rail 84 are mounted to or otherwise disposed at (e.g., on, adjacent, or proximate) the upstream ring body 76. The first lateral rail 82 and the second lateral rail 84 extend axially upstream (e.g., forward) from the upstream ring body 76, for example, parallel to or substantially parallel to the nozzle axis 74 (the second lateral rail 84 is not shown in FIGS. 2A and 2B; see FIG. 3). The first lateral rail 82 is disposed opposite the nozzle axis 74 from the second lateral rail 84.

Referring to FIGS. 2A, 2B, and 3-5, the translating sleeve assembly 64 includes a translating sleeve 90, a first lateral rail guide 92, a second lateral rail guide 94, and an actuator assembly 96.

The translating sleeve 90 includes a sleeve body 98 and a plurality of sleeve hinges 100. The sleeve body 98 is an annular body extending circumferentially about (e.g., completely around) the nozzle axis 74. The sleeve body 98 extends (e.g., axially extends) between and to an upstream end 102 of the sleeve body 98 and a downstream end 104 of the sleeve body 98. The sleeve body 98 extends between and to an inner radial side 106 of the sleeve body 98 and an outer radial side 108 of the sleeve body 98. The sleeve body 98 is disposed radially inside of the fixed nozzle structure 62, for example, with the outer radial side 108 facing the fixed nozzle structure 62 and/or the outer skin 60. The sleeve body 98 is translatable (e.g., axially translatable) within the fixed nozzle structure 62 along the nozzle axis 74 between and to a first axial position (e.g., an upstream axial position; see FIG. 4) and a second axial position (e.g., a downstream axial position; see FIG. 5). The sleeve hinges 100 are mounted to or otherwise disposed at (e.g., on, adjacent, or proximate) the outer radial side 108.

The first lateral rail guide 92 includes a guide body 110 and one or more guide links 112. The guide body 110 is movably mounted on the first lateral rail 82. The guide body 110 is configured to translate (e.g., axially translate) along and engaged with the first lateral rail 82. The guide body 110 is disposed upstream (e.g., axially forward) of the sleeve body 98 and the upstream ring body 76. The guide links 112 extend (e.g., axially extend) between and connect the guide body 110 and the sleeve body 98. Each of the guide links 112 may be pivotably mounted to one or both of the guide body 110 and the sleeve body 98. Each of the guide links 112 may extend through the upstream ring body 76 (e.g., through a respective aperture formed axially through a portion of the upstream ring body 76). However, the present disclosure is not limited to this particular configuration of the guide links 112 and the upstream ring body 76.

The second lateral rail guide 94 includes a guide body 114 and one or more guide links 116. The guide body 114 is movably mounted on the second lateral rail 84. The guide body 114 is configured to translate (e.g., axially translate) along and engaged with the second lateral rail 84. The guide body 114 is disposed upstream (e.g., axially forward) of the sleeve body 98 and the upstream ring body 76. The guide links 116 extend (e.g., axially extend) between and connect the guide body 114 and the sleeve body 98. Each of the guide links 116 may be pivotably mounted to one or both of the guide body 114 and the sleeve body 98. Each of the guide links 116 may extend through the upstream ring body 76 (e.g., through a respective aperture formed axially through a portion of the upstream ring body 76). However, the present disclosure is not limited to this particular configuration of the guide links 116 and the upstream ring body 76.

The actuator assembly 96 is schematically illustrated in FIG. 2B. The actuator assembly 96 includes one or more actuators 118. For example, FIG. 2B illustrates a first actuator 118A for the first lateral rail guide 92. The actuators 118 may similarly include a second actuator for the second lateral rail guide 94 (not shown in FIG. 2B). The actuators 118 are configured as linear actuators for effecting and controlling translation (e.g., axial translation) of the first lateral rail guide 92 and the second lateral rail guide 94 along the first lateral rail 82 and the second lateral rail 84, respectively. The actuators 118 may be configured as hydraulic actuators, pneumatic actuators, electric-mechanical actuators, or any other suitable linear actuator configuration. The actuators 118 may be mounted to or disposed at (e.g., on, adjacent, or proximate) the fixed nozzle structure 62, the engine static structure 36 (see FIG. 1), the nacelle 24 (see FIG. 1), or another suitable fixed structure. The actuators 118 may be mounted to a respective one of the first lateral rail guide 92 and the second lateral rail guide 94 by an actuation rod 120, shown in FIG. 2B extending between and connecting the first actuator 118A and the first lateral rail guide 92.

Figure 6:
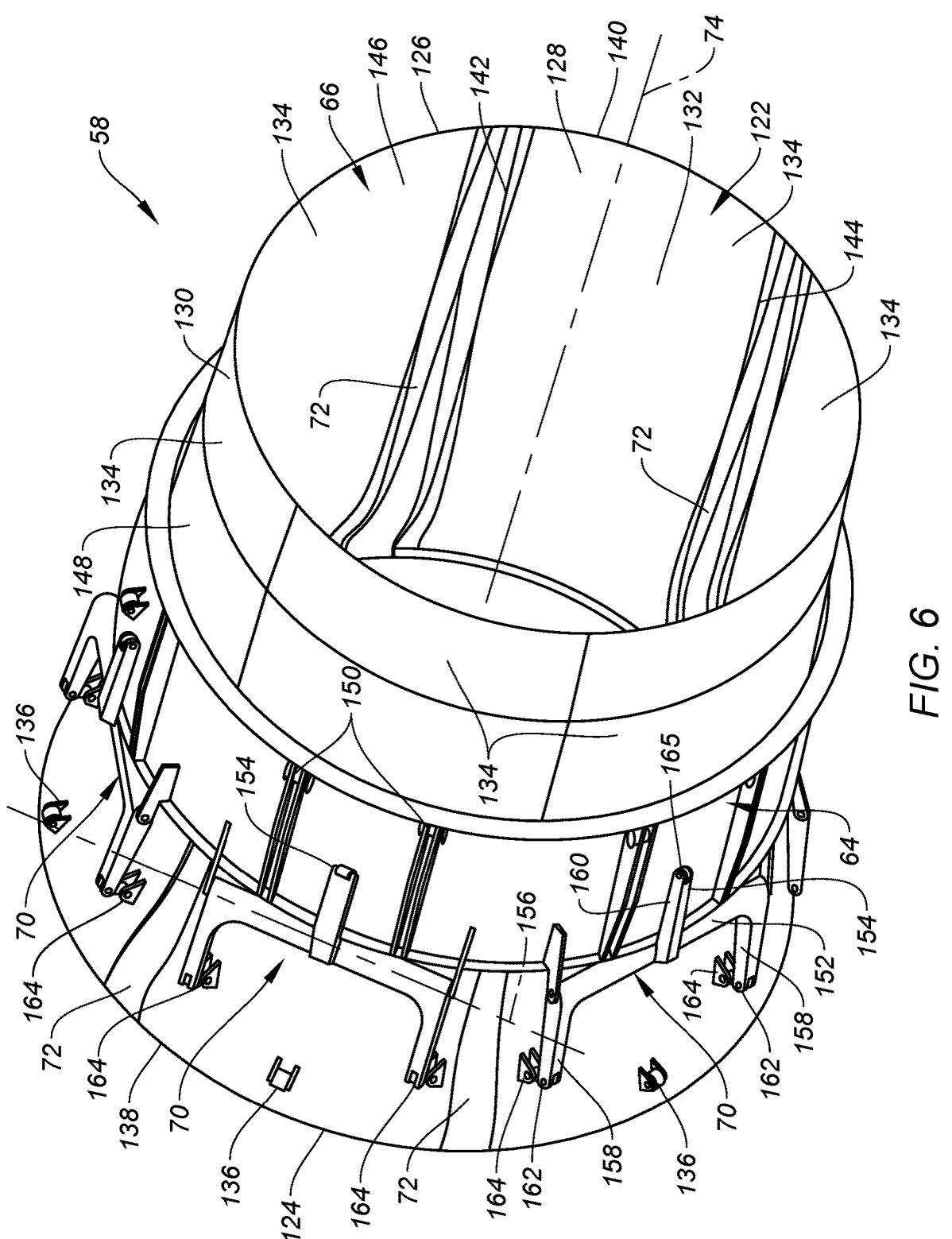
FIG. 6 illustrates a perspective view of another portion of the variable area nozzle assembly, in accordance with one or more embodiments of the present disclosure.

FIG. 6 illustrates a perspective view of the variable area nozzle assembly 58 including the translating sleeve assembly 64, the nozzle segments 66, and the segment cranks 70 assembled together.

The nozzle segments 66 are arranged together circumferentially about the nozzle axis 74 to form all or a substantial portion of a variable area nozzle 122 of the variable area nozzle assembly 58. The variable area nozzle 122 extends circumferentially about (e.g., completely around) the nozzle axis 74. The variable area nozzle 122 extends (e.g., axially extends) between and to an upstream end 124 of the variable area nozzle 122 and a downstream end 126 of the variable area nozzle 122. The variable area nozzle 122 extends (e.g., radially extends) between and to an inner radial side 128 of the variable area nozzle 122 and an outer radial side 130 of the variable area nozzle 122. The inner radial side forms an exhaust flow surface 132 of and through the variable area nozzle 122.

Each of the nozzle segments 66 includes a segment body 134 (sometimes referred to as a "petal" or a "turkey feather") and at least one segment roller 136. The segment body 134 extends (e.g., axially extends) between and to an upstream end 138 of the segment body 134 and a downstream end 140 of the segment body 134. The upstream end 138 forms a circumferential portion of the upstream end 124. The downstream end 140 forms a circumferential portion of the downstream end 126. The segment body 134 extends (e.g., circumferentially extends) between and to a first circumferential end 142 of the segment body 134 and a second circumferential end 144 of the segment body 134. Each of the first circumferential end 142 and the second circumferential end 144 may be disposed at (e.g., on, adjacent, or proximate) a circumferentially adjacent one of the nozzle segments 66. The segment body 134 extends (e.g., radially extends) between and to an inner radial surface 146 of the segment body 134 and an outer radial surface 148 of the segment body 134. Each of the inner radial surface 146 and the outer radial surface 148 extend between and to the upstream end 138 and the downstream end 140 and between and to the first circumferential end 142 and the second circumferential end 144. The inner radial surface 146 forms a circumferential portion of the exhaust flow surface 132 on the inner radial side 128. The segment body 134 may form a convex body portion facing the nozzle axis 74, for example, at (e.g., on, adjacent, or proximate) the upstream end 138. The segment body 134 may form a concave body portion facing the nozzle axis 74, for example, at (e.g., on, adjacent, or proximate) the downstream end 140. The present disclosure, however, is not limited to any particular shape of the segment body 134.

Each of the nozzle segments 66 are disposed radially inside of and pivotably mounted to the sleeve body 98. For example, an axially-intermediate position of the segment body 134 (e.g., the outer radial surface 148) for each of the nozzle segments 66 may be pivotably mounted to the sleeve body 98 (e.g., the inner radial side 106) by one or more hinges 150 having a pivot axis (e.g., a pivot axis extending tangent to or substantially tangent to a circumference of the sleeve body 98). With the nozzle segments 66 pivotably mounted to the sleeve body 98, the upstream end 124 is disposed upstream of the sleeve body 98 (e.g., the upstream end 102) and the downstream end 126 is disposed downstream of the sleeve body 98 (e.g., the upstream end 102)

The segment roller 136 is mounted to or otherwise disposed at (e.g., on, adjacent, or proximate) the segment body 134 on the outer radial surface 148. For example, the segment roller 136 may be disposed at (e.g., on, adjacent, or proximate) the upstream end 138.

The segment cranks 70 include a segment crank for each of the nozzle segments 66. Each of the segment cranks 70 includes a crank body 152 and a crank roller 154. The crank body 152 is pivotably mounted to the sleeve body 98 by the sleeve hinges 100. For example, the crank body 152 may be pivotably mounted to the sleeve body 98 by a circumferentially-adjacent pair of the sleeve hinges 100. The crank body 152 is pivotably relative to the sleeve body 98 about a pivot axis 156. The crank body 152 includes at least one first arm portion 158 and a second arm portion 160. Each of the at least one first arm portion 158 extends axially upstream from the pivot axis 156 to a distal end 162. Each of the at least one first arm portion 158 is pivotably mounted to the segment body 134 (e.g., the outer radial surface 148) of a respective one of the nozzle segments 66 at the distal end 162. For example, each of the at least one first arm portion 158 may be pivotably mounted to the segment body 134 by a crank hinge 164. The crank hinge 164 may include a link or other attachment member pivotably mounting the at least one first arm portion 158 to the segment body 134, for example, to accommodate limited axial and/or radial movement of the at least one first arm portion 158 relative to the segment body 134 at (e.g., on, adjacent, or proximate) the crank hinge 164. The second arm portion 160 extends axially downstream from the pivot axis 156 to a distal end 165. The crank roller 154 is disposed on the crank body 152 at (e.g., on, adjacent, or proximate) the distal end 165.

The variable area nozzle assembly 58 may include the segment seals 72 to seal circumferential gaps between circumferentially adjacent nozzle segments 66, and thereby form circumferential portions of the exhaust flow surface 132. For example, each of the segment seals 72 may extend circumferentially between and connect each circumferentially adjacent pair of the nozzle segments 66. Each of the segment seals 72 may be pivotably mounted to the sleeve body 98. Each of the segment seals 72 may be formed wholly or in substantial part of a resilient and high-temperature resistant seal material. The present disclosure, however, is not limited to any particular material of the segment seals 72.

Figure 7:
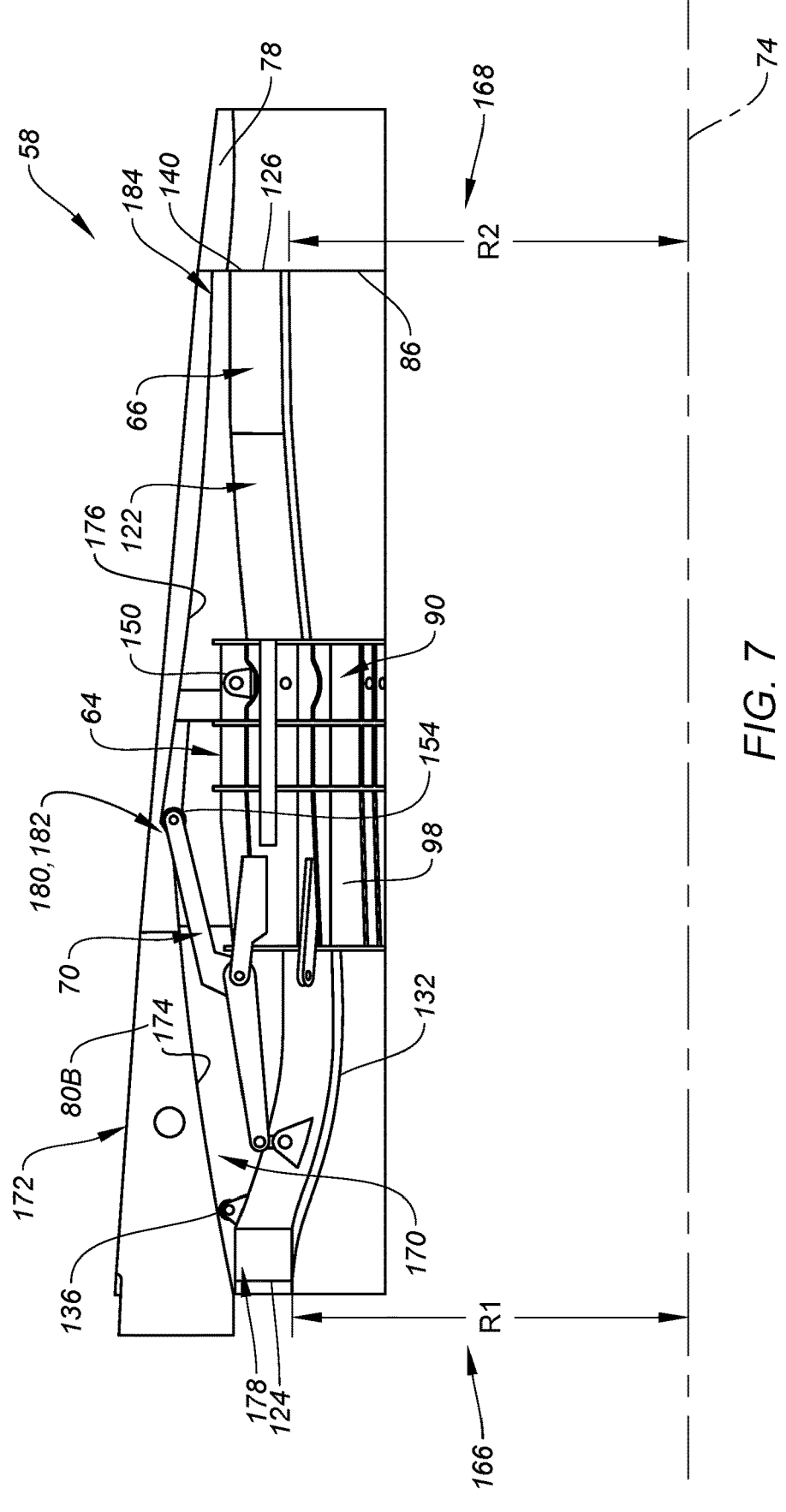
FIG. 7 illustrates a cutaway, side view of a portion of the variable area nozzle assembly with a translating sleeve in a first position, in accordance with one or more embodiments of the present disclosure.
Figure 8:
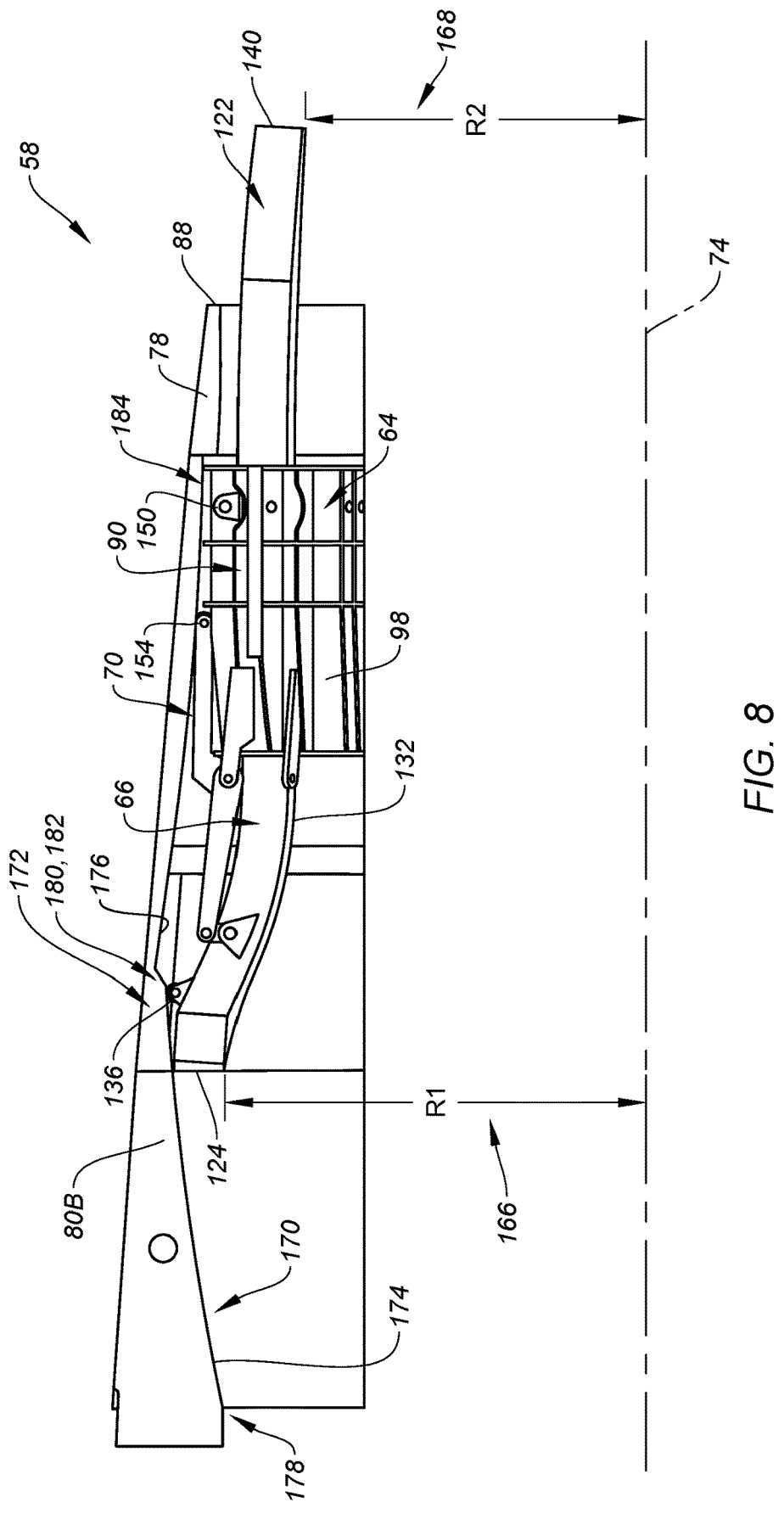
FIG. 8 illustrates a cutaway, side view of a portion of the variable area nozzle assembly with a translating sleeve in a second position, in accordance with one or more embodiments of the present disclosure.

FIGS. 7 and 8 illustrate cutaway, side views of the variable area nozzle assembly 58 for different positions of the translating sleeve assembly 64, the nozzle segments 66, and the segment cranks 70. For example, FIG. 7 illustrates a retracted position of the variable area nozzle 122 (e.g., an upstream axial position of the sleeve body 98 and the nozzle segments 66; see FIG. 4) and FIG. 8 illustrates an extended position of the variable area nozzle 122 (e.g., a downstream axial position of the sleeve body 98 and the nozzle segments 66; see FIG. 5).

The nozzle segments 66 form a throat cross-sectional area 166 (sometimes referred to as an "A8" cross-sectional area) of the variable area nozzle 122 at (e.g., on, adjacent, or proximate) the upstream end 124. The throat cross-sectional area 166 may be understood as the cross-sectional area taken along a plane orthogonal to the nozzle axis 74 and circumscribed by the exhaust flow surface 132. The throat cross-sectional area 166 has a radius R1 extending (e.g., radially extending) between the nozzle axis 74 and the exhaust flow surface 132.

The nozzle segments 66 form an outlet cross-sectional area 168 (sometimes referred to as an "A9" cross-sectional area) of the variable area nozzle 122 at (e.g., on, adjacent, or proximate) the downstream end 126. The outlet cross-sectional area 168 may be understood as the cross-sectional area taken along a plane orthogonal to the nozzle axis 74 and circumscribed by the exhaust flow surface 132. The outlet cross-sectional area 168 has a radius R2 extending (e.g., radially extending) between the nozzle axis 74 and the exhaust flow surface 132.

FIGS. 7 and 8 illustrate a portion of one of the segment guide beams 80B in greater detail (see FIGS. 2A and 2B). As shown in FIGS. 7 and 8, the segment guide beam 80B extends (e.g., radially extends) between and to an inner radial side 170 of the segment guide beam 80B and an outer radial side 172 of the segment guide beam 80B. The inner radial side 170 forms an upstream surface portion 174 and a downstream surface portion 176. Each of the upstream surface portion 174 and the downstream surface portion 176 extend circumferentially about (e.g., completely around) the nozzle axis 74.

The upstream surface portion 174 extends between and to an upstream axial end 178 of the upstream surface portion 174 and a downstream axial end 180 of the upstream surface portion 174. The downstream axial end 180 may be disposed at (e.g., on, adjacent, or proximate) the downstream surface portion 176. The upstream surface portion 174 is ramped surface for which a radial distance between the upstream surface portion 174 and the nozzle axis 74 increases in an axial direction from the upstream axial end 178 to or toward the downstream axial end 180. The segment roller 136 is disposed in contact with the upstream surface portion 174 and configured to roll along the upstream surface portion 174 in the axial direction.

The downstream surface portion 176 extends between and to an upstream axial end 182 of the downstream surface portion 176 and a downstream axial end 184 of the downstream surface portion 176. The upstream axial end 182 may be disposed at (e.g., on, adjacent, or proximate) the upstream surface portion 174 (e.g., the downstream axial end 180). The downstream axial end 184 may be disposed at (e.g., on, adjacent, or proximate) the downstream ring body 78. The downstream surface portion 176 is a ramped surface for which a radial distance between the downstream surface portion 176 and the nozzle axis 74 decreases in an axial direction from the upstream axial end 182 to or toward the downstream axial end 184. The crank roller 154 is disposed in contact with the downstream surface portion 176 and configured to roll along the downstream surface portion 176 in the axial direction.

The variable area nozzle assembly 58 may operate to control sizes of the throat cross-sectional area 166 and the outlet cross-sectional area 168 to optimally control gas turbine engine exhaust flow through the variable area nozzle 122 for different propulsion system 20 operating conditions (see FIG. 1). For an operation of the variable area nozzle assembly 58 to position the variable area nozzle 122 from the retracted position (see FIG. 7) to the extended position (see FIG. 8), the actuator assembly 96 effects translation of the first lateral rail guide 92 and the second lateral rail guide 94 in an axially downstream direction, thereby effecting translation of the translating sleeve 90 in the axially downstream direction (see FIG. 2B). As the translating sleeve 90 translates in the axially downstream direction, the segment roller 136 rolls along the upstream surface portion 174 and the crank roller 154 rolls along the downstream surface portion 176, thereby pivoting each of the nozzle segments 66 (e.g., about the hinges 150) to increase the throat cross-sectional area 166 (e.g., the radius R1) and decrease the outlet cross-sectional area 168 (e.g., the radius R2). In the extended position of the variable area nozzle 122, the downstream end 140 may be disposed axially downstream of the downstream ring body 78 (e.g., the downstream end 88). For an operation of the variable area nozzle assembly 58 to position the variable area nozzle 122 from the extended position (see FIG. 8) to the retracted position (see FIG. 7), the actuator assembly 96 effects translation of the first lateral rail guide 92 and the second lateral rail guide 94 in an axially upstream direction, thereby effecting translation of the translating sleeve 90 in the axially upstream direction (see FIG. 2B). As the translating sleeve 90 translates in the axially upstream direction, the segment roller 136 rolls along the upstream surface portion 174 and the crank roller 154 rolls along the downstream surface portion 176, thereby pivoting each of the nozzle segments 66 (e.g., about the hinges 150) to decrease the throat cross-sectional area 166 (e.g., the radius R1) and increase the outlet cross-sectional area 168 (e.g., the radius R2). In the retracted position of the variable area nozzle 122, the downstream end 140 may be disposed at or axially upstream of the downstream ring body 78 (e.g., the upstream end 86).

Figure 9:
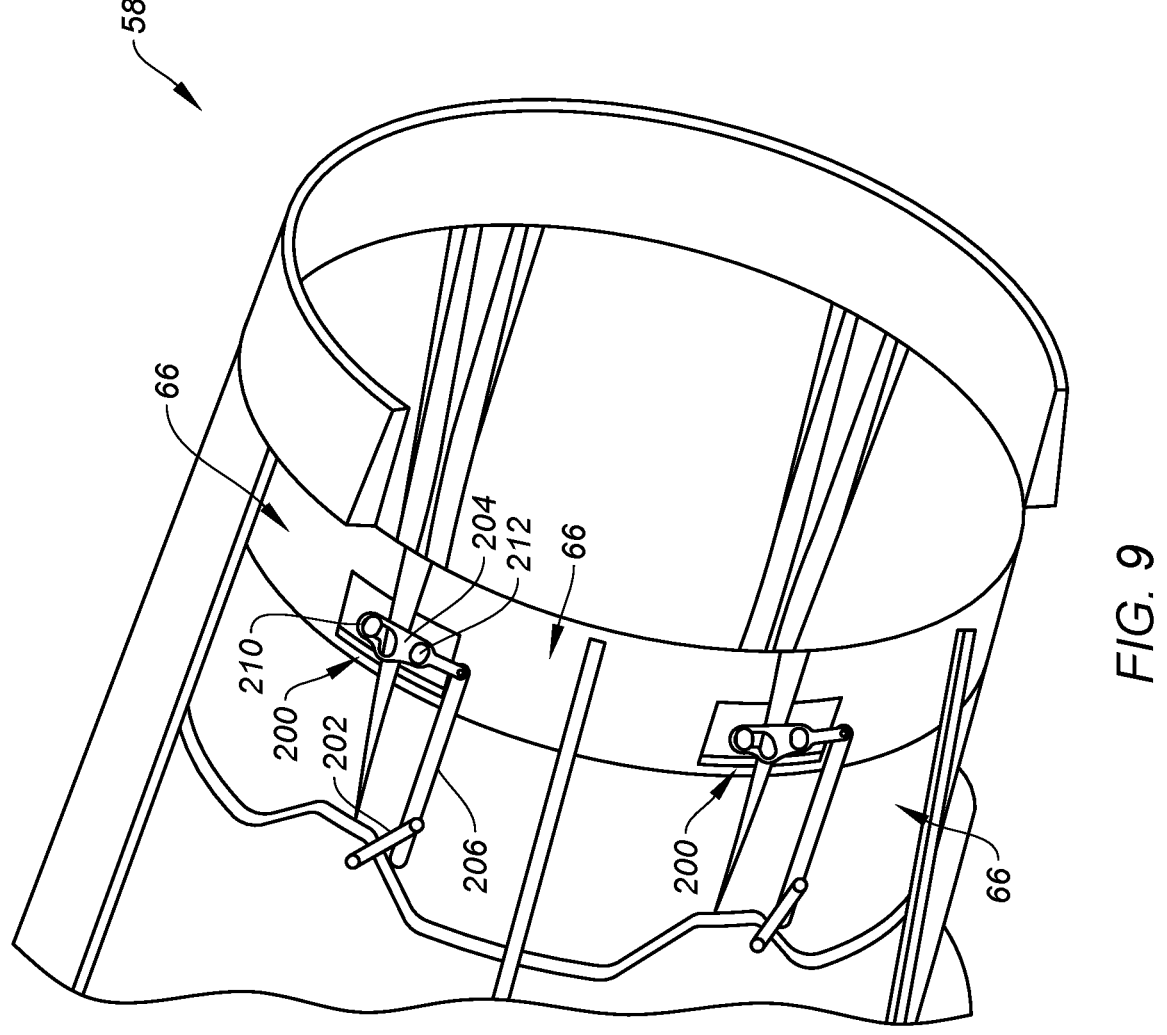
FIG. 9 illustrates a cutaway, perspective view of another variable area nozzle assembly including a plurality of segment hoop locking assemblies, in accordance with one or more embodiments of the present disclosure.
Figures 10, 11:
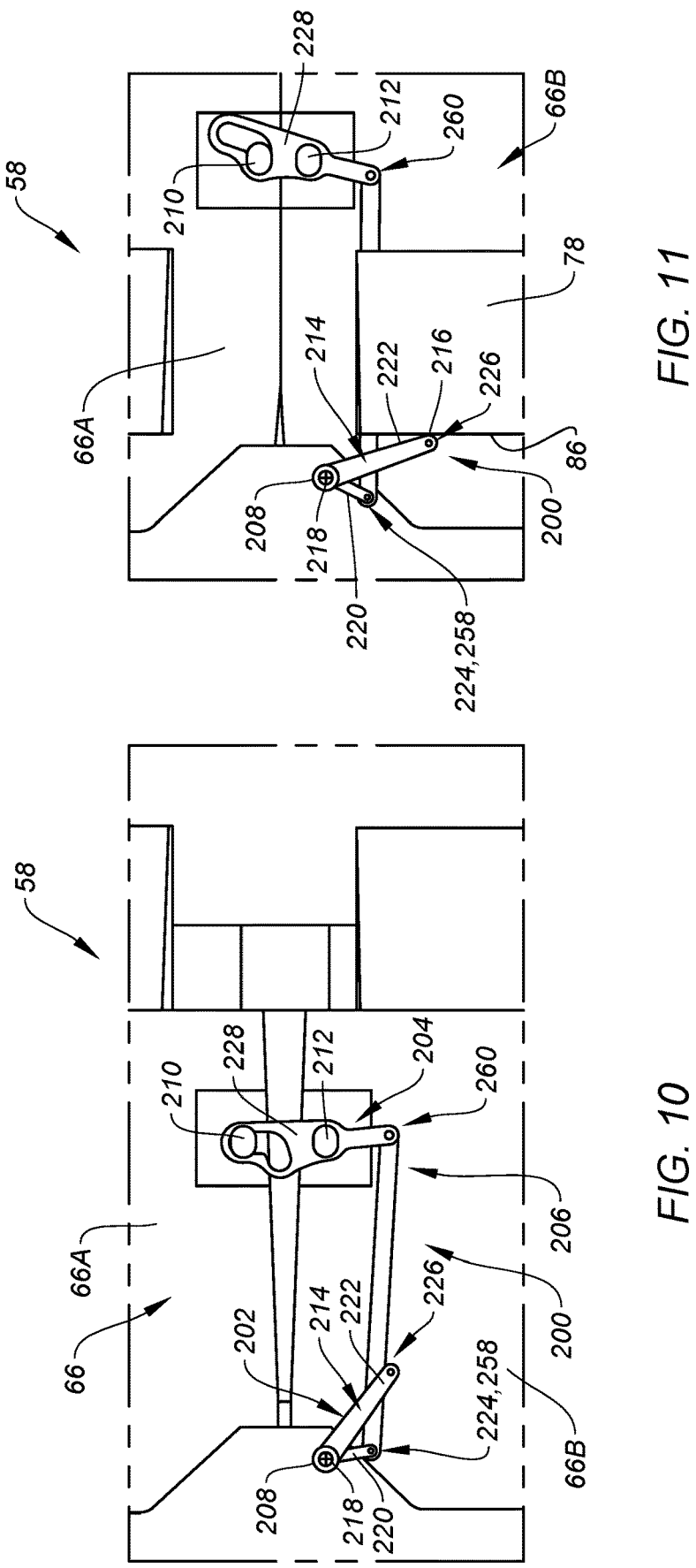
FIG. 10 illustrates a cutaway view of the variable area nozzle assembly of FIG. 9 with a segment hoop locking assembly in a first locking condition, in accordance with one or more embodiments of the present disclosure.
FIG. 11 illustrates a cutaway view of the variable area nozzle assembly of FIG. 9 with the segment hoop locking assembly in a second locking condition, in accordance with one or more embodiments of the present disclosure.

Referring to FIGS. 9-12, in some embodiments, the variable area nozzle assembly 58 may include a plurality of segment hoop locking assemblies 200. The present disclosure segment hoop locking assemblies 200, however, are not limited to use with all or portions of the foregoing exemplary configuration of the variable area nozzle assembly 58 (e.g., the outer skin 60, the fixed nozzle structure 62, the translating sleeve assembly 64, the plurality of nozzle segments 66, and/or the plurality of segment cranks 70). Each of the segment hoop locking assemblies 200 may be configured for a selective locking function for each circumferentially-adjacent pair of the nozzle segments 66. Each of the segment hoop locking assemblies 200 includes a lock crank 202, a hoop crank 204, a link 206, a biasing member 208, a first hoop crank receiver 210, and a second hoop crank receiver 212. FIG. 9 illustrates a perspective view of the variable area nozzle assembly 58 including the segment hoop locking assemblies 200. FIGS. 10 and 11 illustrate one of the segment hoop locking assemblies 200 in different locking conditions. Portions of the variable area nozzle assembly 58 (e.g., the fixed nozzle structure 62) are omitted in FIGS. 10 and 11 for clarity.

The lock crank 202 includes a lock crank body 214 and a roller 216. The lock crank body 214 is pivotably mounted to the sleeve body 98 (e.g., the outer radial side 108) about a pivot axis 218. The pivot axis 218 may extend radially or substantially radially relative to the nozzle axis 74. The lock crank body 214 includes a first arm portion 220 and a second arm portion 222. The first arm portion 220 is disposed radially inside of the sleeve body 98, relative to the nozzle axis 74. The first arm portion 220 extends radially outward from the pivot axis 218 to a distal end 224. The second arm portion 222 is disposed radially outside of the sleeve body 98, relative to the nozzle axis 74. The second arm portion 222 extends radially outward from the pivot axis 218 to a distal end 226. The second arm portion 222 (e.g., the distal end 226) is radially coincident with the downstream ring body 78, relative to the nozzle axis 74. The first arm portion 220 is circumferentially offset from the second arm portion 222 relative to the pivot axis 218. The roller 216 is disposed at (e.g., on, adjacent, or proximate) the distal end 226.

The hoop crank 204 includes a hoop crank body 228. The hoop crank body 228 includes a base portion 230 and an arm portion 232. The base portion 230 extends between and to a first axial end 234 of the base portion 230 and a second axial end 236 of the base portion 230 (e.g., axial relative to the nozzle axis 74). The base portion 230 extends between and to a first circumferential end 238 of the base portion 230 and a second circumferential end 240 of the base portion 230 (e.g., circumferential relative to the nozzle axis 74). The base portion 230 forms a first locking aperture 242 and a second locking aperture 244 of the hoop crank 204. The first locking aperture 242 and the second locking aperture 244 extend radially through the base portion 230, relative to the nozzle axis 74. The first locking aperture 242 is disposed at (e.g., on, adjacent, or proximate) the first circumferential end 238. The second locking aperture 244 is disposed at (e.g., on, adjacent, or proximate) the second circumferential end 240. The arm portion 232 extends outward (e.g., circumferentially outward) from the second circumferential end 240 to a distal end 246.

Figure 12:
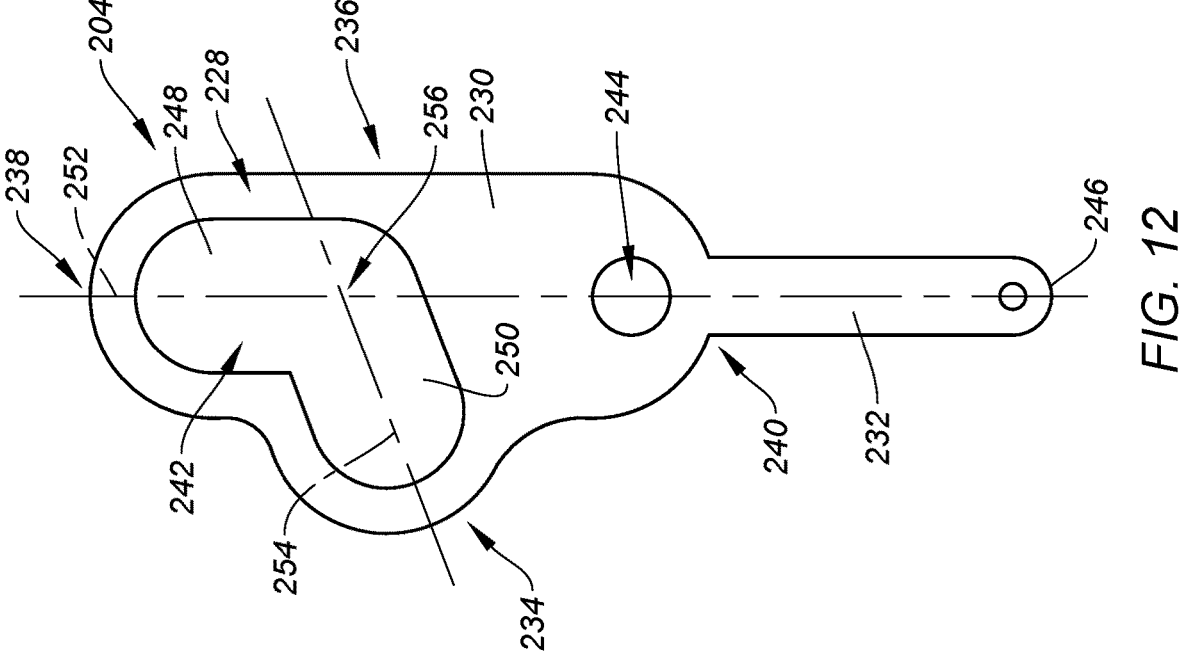
FIG. 12 illustrates a plan view of a hoop crank for a segment hoop looking assembly, in accordance with one or more embodiments of the present disclosure.

As best shown in FIG. 12, in some embodiments, the first locking aperture 242 may be formed by two interconnected lobe portions-a first lobe portion 248 and a second lobe portion 250. The first lobe portion 248 extends lengthwise along a first axis 252. The second lobe portion 250 extends lengthwise along a second axis 254. The first axis 252 and the second axis 254 intersect at a point 256 within the first locking aperture 242. The first axis 252 and the second axis 254 may be non-orthogonal. The first axis 252 may extend between and through the first circumferential end 238 and the second circumferential end 240. The first axis 252 may additionally extend through the distal end 246. The second axis 254 may extend between and through the first axial end 234 and the second axial end 236. The first lobe portion 248 extends along the first axis 252 away from the second lobe portion 250 and toward the first circumferential end 238. The second lobe portion 250 extends along the second axis 254 away from the first lobe portion 248 and toward the first axial end 234.

The link 206 connects the lock crank 202 and the hoop crank 204. The link 206 extends between and to a first axial end 258 of the link 206 and a second axial end 260 of the link 206. The first axial end 258 is pivotably mounted to the first arm portion 220 at (e.g., on, adjacent, or proximate) the distal end 224. The second axial end 260 is pivotably mounted to the arm portion 232 at (e.g., on, adjacent, or proximate) the distal end 246 of the hoop crank 204.

The biasing member 208 (e.g., a spring) is disposed in contact with and between the sleeve body 98 and the lock crank body 214, for example, about the pivot axis 218. The biasing member 208 is configured to pivotably bias the lock crank body 214 such that the lock crank body 214 (e.g., the first arm portion 220) biases the link 206 in a direction axially toward the hoop crank 204 as shown, for example, in FIG. 10.

FIGS. 10 and 11 illustrate a first nozzle segment 66A and a circumferentially adjacent second nozzle segment 66B of the nozzle segments 66. The first hoop crank receiver 210 is mounted on the segment body 134 (e.g., the outer radial surface 148) of the first nozzle segment 66A at (e.g., on, adjacent, or proximate) the second circumferential end 144. The first hoop crank receiver 210 is disposed within the first locking aperture 242. The second hoop crank receiver 212 is mounted on the segment body 134 (e.g., the outer radial surface 148) of the second nozzle segment 66B at (e.g., on, adjacent, or proximate) the first circumferential end 142. The second hoop crank receiver 212 is pivotably mounted to the hoop crank body 228. The second hoop crank receiver 212 is disposed within the second locking aperture 244 such that the hoop crank body 228 may pivot about the second hoop crank receiver 212. The first hoop crank receiver 210 and the second hoop crank receiver 212 are disposed at a same or substantially same axial position on the nozzle segments 66. As shown in FIGS. 10 and 11, each of the first hoop crank receiver 210 and the second hoop crank receiver 212 may have an enlarged head disposed radially outward of the hoop crank body 228 to maintain the hoop crank body 228 engaged with the first hoop crank receiver 210 and the second hoop crank receiver 212.

The hoop crank 204 is engageable with the first hoop crank receiver 210 and the second hoop crank receiver 212 in a first locking condition of the hoop crank 204 and a second locking condition of the hoop crank 204. FIG. 10 illustrates the first locking condition of the hoop crank 204.

With the variable area nozzle 122 (e.g., the translating sleeve 90) in the retracted position, as shown in FIG. 10 (see also FIG. 7), the biasing member 208 biases the lock crank body 214 such that the lock crank body 214 actuates the link 206 in a direction axially toward the hoop crank 204, thereby pivoting the hoop crank 204 (e.g., about the second hoop crank receiver 212) into a pivot position in which the first hoop crank receiver 210 is disposed within the first lobe portion 248. In this first locking condition of the hoop crank 204, the hoop crank 204 prevents or restricts circumferential separation of the first nozzle segment 66A from the second nozzle segment 66B with the variable area nozzle 122 in the retracted position. For example, the hoop crank 204 may prevents or restricts circumferential separation of the first nozzle segment 66A from the second nozzle segment 66B with the variable area nozzle 122 forming a maximum area of the outlet cross-sectional area 168 (see FIG. 7). With the variable area nozzle 122 (e.g., the translating sleeve 90) in the extended position, as shown in FIG. 11 (see also FIG. 8), the roller 216 contacts the downstream ring body 78 (e.g., the upstream end 86), pivoting the lock crank 202 against the biasing force of the biasing member 208 such that the lock crank 202 actuates the link 206 in a direction axially away from the hoop crank 204, thereby pivoting the hoop crank 204 (e.g., about the second hoop crank receiver 212) into a pivot position in which the first hoop crank receiver 210 is disposed within the second lobe portion 250. In this second locking condition of the hoop crank 204, the hoop crank 204 prevents or restricts circumferential movement of the first nozzle segment 66A relative to the second nozzle segment 66B with the variable area nozzle 122 in the extended position. For example, the hoop crank 204 may prevents or restricts circumferential movement of the first nozzle segment 66A relative to the second nozzle segment 66B with the variable area nozzle 122 forming a minimum area of the outlet cross-sectional area 168 (see FIG. 8). Accordingly, the present disclosure segment hoop locking assemblies 200 provide hoop support and circumferential locking features for different positions and outlet cross-sectional areas of the variable area nozzle, using only the movement of the translating sleeve 90 to configure the segment hoop locking assemblies 200 in the first locking condition and the second locking condition.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation which may be used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A variable area nozzle assembly for an aircraft propulsion system, the variable area nozzle assembly comprising:
a fixed nozzle structure extending circumferentially about a nozzle axis;
a translating sleeve assembly including a translating sleeve, the translating sleeve is movably mounted to the fixed nozzle structure, the translating sleeve is translatable along the nozzle axis within the fixed nozzle structure between and to a first axial position and a second axial position;
a plurality of nozzle segments forming a variable area nozzle extending circumferentially about the nozzle axis, each nozzle segment of the plurality of nozzle segments is pivotably mounted to the translating sleeve, the plurality of nozzle segments includes a first nozzle segment and a second nozzle segment, and the first nozzle segment is circumferentially adjacent the second nozzle segment; and
a plurality of segment hoop locking assemblies including a first segment hoop locking assembly, the first segment hoop locking assembly includes a lock crank, a hoop crank, a first hoop crank receiver, and a second hoop crank receiver, the lock crank is pivotably mounted to the translating sleeve, the lock crank is pivotable about a pivot axis, the hoop crank is connected to the lock crank, the hoop crank includes a first locking aperture and a second locking aperture, the first hoop crank receiver is mounted on the first nozzle segment and disposed within the first locking aperture, the second hoop crank receiver is mounted on the second nozzle segment and disposed within the second locking aperture, and the lock crank is pivotable about the pivot axis to configure the hoop crank in a first locking condition and a second locking condition such that:
with the translating sleeve in the first axial position, the lock crank in a first pivot position relative to the pivot axis positions the hoop crank to configure the hoop crank in the first locking condition to restrict circumferential movement of the first nozzle segment relative to the second nozzle segment; and
with the translating sleeve in the second axial position, the lock crank in a second pivot position relative to the pivot axis positions the hoop crank to configure the hoop crank in the second locking condition to restrict circumferential movement of the first nozzle segment relative to the second nozzle segment;
wherein the variable area nozzle extends axially between and to an upstream nozzle end and a downstream nozzle end, the upstream nozzle end forms a throat cross-sectional area of the variable area nozzle, the downstream nozzle end forms an outlet cross-sectional area of the variable area nozzle, and translation of the translating sleeve along the nozzle axis varies a cross-sectional area of the throat cross-sectional area and the outlet cross-sectional area; and
wherein the fixed nozzle structure includes a downstream structure end, in the first axial position the translating sleeve positions the variable area nozzle in a retracted position with the downstream nozzle end disposed axially upstream of the downstream structure end, and in the second axial position the translating sleeve positions the variable area nozzle in an extended position with the downstream nozzle end disposed axially downstream of the downstream structure end.

2. The variable area nozzle assembly of claim 1, wherein with the translating sleeve in the first axial position, the throat cross-sectional area has a minimum throat cross-sectional area and the outlet cross-sectional area has a maximum outlet cross-sectional area.

3. The variable area nozzle assembly of claim 2, wherein with the translating sleeve in the second axial position, the throat cross-sectional area has a maximum throat cross-sectional area and the outlet cross-sectional area has a minimum outlet cross-sectional area.

4. The variable area nozzle assembly of claim 1, wherein the first segment hoop locking assembly includes a link, the lock crank includes a first arm portion, the first arm portion extends radially outward from the pivot axis to a first distal end, and the link is pivotably mounted to the first distal end and the hoop crank.

5. The variable area nozzle assembly of claim 4, wherein the lock crank includes a second arm portion, the second arm portion extends radially outward from the pivot axis to a second distal end, in the first axial position of the translating sleeve the second distal end is separated from the fixed nozzle structure, and in the second axial position of the translating sleeve the second distal end contacts the fixed nozzle structure.

6. The variable area nozzle assembly of claim 5, wherein the first arm portion and the second arm portion are circumferentially offset relative to the pivot axis.

7. The variable area nozzle assembly of claim 1, wherein the first locking aperture includes a first lobe portion and a second lobe portion, the first lobe portion and the second lobe portion are interconnected to form the first locking aperture.

8. The variable area nozzle assembly of claim 7, wherein in the first locking condition of the hoop crank the first hoop crank receiver is disposed within the first lobe portion and in the second locking condition of the hoop crank the first hoop crank receiver is disposed within the second lobe portion.

9. The variable area nozzle assembly of claim 7, wherein the first lobe portion extends lengthwise along a first lobe axis, the second lobe portion extends lengthwise along a second lobe axis, and the first lobe axis intersects the second lobe axis within the first locking aperture.

10. The variable area nozzle assembly of claim 1, wherein the fixed nozzle structure includes an inner radial structure side forming a ramped upstream surface portion and a ramped downstream surface portion, wherein each nozzle segment of the plurality of nozzle segments includes a segment roller disposed at the ramped upstream surface portion and configured to roll along the ramped upstream surface portion as the translating sleeve translates between the first axial position and the second axial position.

11. The variable area nozzle assembly of claim 10, further comprising a plurality of segment cranks, each segment crank of the plurality of segment cranks pivotably mounted to the translating sleeve and to a respective nozzle segment of the plurality of nozzle segments, each segment crank includes a crank roller disposed at the ramped downstream surface portion and configured to roll along the ramped downstream surface portion as the translating sleeve translates between the first axial position and the second axial position.

12. A variable area nozzle assembly for an aircraft propulsion system, the variable area nozzle assembly comprising:

a fixed nozzle structure extending circumferentially about a nozzle axis;

a translating sleeve assembly including a translating sleeve, the translating sleeve is movably mounted to the fixed nozzle structure, the translating sleeve is translatable along the nozzle axis within the fixed nozzle structure between and to a first axial position and a second axial position;

a plurality of nozzle segments forming a variable area nozzle extending circumferentially about the nozzle axis, each nozzle segment of the plurality of nozzle segments is pivotably mounted to the translating sleeve, the plurality of nozzle segments includes a first nozzle segment and a second nozzle segment, and the first nozzle segment is circumferentially adjacent the second nozzle segment; and a plurality of segment hoop locking assemblies including a first segment hoop locking assembly, the first segment hoop locking assembly includes a lock crank, a hoop crank, a first hoop crank receiver, and a second hoop crank receiver, the lock crank is pivotably mounted to the translating sleeve, the lock crank is pivotable about a pivot axis, the hoop crank is connected to the lock crank, the hoop crank includes a first locking aperture and a second locking aperture, the first hoop crank receiver is mounted on the first nozzle segment and disposed within the first locking aperture, the second hoop crank receiver is mounted on the second nozzle segment and disposed within the second locking aperture, and the lock crank is pivotable about the pivot axis to configure the hoop crank in a first locking condition and a second locking condition such that:

with the translating sleeve in the first axial position, the lock crank in a first pivot position relative to the pivot axis positions the hoop crank to configure the hoop crank in the first locking condition to restrict circumferential movement of the first nozzle segment relative to the second nozzle segment; and with the translating sleeve in the second axial position, the lock crank in a second pivot position relative to the pivot axis positions the hoop crank to configure the hoop crank in the second locking condition to restrict circumferential movement of the first nozzle segment relative to the second nozzle segment, wherein the first segment hoop locking assembly includes a link, the lock crank includes a first arm portion, the first arm portion extends radially outward from the pivot axis to a first distal end, and the link is pivotably mounted to the first distal end and the hoop crank.

13. The variable area nozzle assembly of claim 12, wherein the lock crank includes a second arm portion, the second arm portion extends radially outward from the pivot axis to a second distal end, in the first axial position of the translating sleeve the second distal end is separated from the fixed nozzle structure, and in the second axial position of the translating sleeve the second distal end contacts the fixed nozzle structure.

14. The variable area nozzle assembly of claim 13, wherein the first arm portion and the second arm portion are circumferentially offset relative to the pivot axis.

* * * * *